(12) United States Patent
Lockhart

(10) Patent No.: US 6,627,004 B1
(45) Date of Patent: Sep. 30, 2003

(54) CARRIAGE FOR CUTTING, BEVELING AND WELDING TORCHES

(75) Inventor: Donald S. Lockhart, Tulsa, OK (US)

(73) Assignee: Mathey Dearman, Inc., Tulsa, OK (US)

(*) Notice: Subject to any disclaimer, the term of this patent is extended or adjusted under 35 U.S.C. 154(b) by 18 days.

(21) Appl. No.: 10/050,975

(22) Filed: Jan. 18, 2002

Related U.S. Application Data (63) Continuation of application No. 09/576,340, filed on May 22, 2000, now abandoned.

(51) Int. Cl.[7] .................................................. B23K 7/00
(52) U.S. Cl. ............................. 148/196; 266/67; 266/73
(58) Field of Search .............................. 266/48, 67, 73; 148/194, 195, 196; 228/57

(56) References Cited

U.S. PATENT DOCUMENTS

| 2,055,527 A | * | 9/1936 | Glaum, Jr. et al. | ........... 266/67 |
| 2,183,605 A | * | 12/1939 | Bucknam et al. | ............ 266/67 |
| 2,293,879 A | * | 8/1942 | Anderson et al. | ............ 266/67 |
| 5,693,286 A | * | 12/1997 | Hatanaka et al. | ............. 266/67 |
| 5,853,655 A | * | 12/1998 | Baker | ......................... 266/73 |

FOREIGN PATENT DOCUMENTS

JP    359064196 A    *   4/1984    ................. 228/57

* cited by examiner

Primary Examiner—Scott Kastler
(74) Attorney, Agent, or Firm—Frank J. Catalano (57) ABSTRACT

A carriage for guiding a cutting, beveling or welding torch on the surface of a metal work piece has a chassis which is transported along a main path on the work piece by a magnetic wheel assembly driven by a reversible motor mounted on the chassis. A rack and pinion assembly mounted on the chassis is driven by another reversible motor mounted on the chassis to transport a torch holder along a path perpendicular to the main path. A remote controller electrically connected to the drive motors is manually operable to simultaneously permit forward or backward transport of the chassis, right or left transport of the holder and variation of the angular velocity of the chassis motor and the rack and pinion motor so as to accurately trace any cutting path on the work piece with the torch. The elevation of the torch above the work piece and the angle of incidence between the torch and the work piece are manually adjustable.

20 Claims, 7 Drawing Sheets

CARRIAGE FOR CUTTING, BEVELING AND WELDING TORCHES

This application is a continuation of application Ser. No. 09/576,340 filed on May 22, 2000, now abandoned.

BACKGROUND OF THE INVENTION

This invention relates generally to cutting, beveling and welding torches for carbon steel workpieces and more particularly concerns carriages for transporting and guiding such torches along a desired path on a workpiece.

Known torch carriages permit variation of the direction and speed of travel of only the carriage along the workpiece. Thus, the torch can only follow the carriage path and any variation in the work path from the carriage path can be accounted for only by reorienting the carriage on the workpiece. It is not presently possible to trace any desired path on a workpiece in a single remotely controlled operation of the carriage.

It is, therefore, an object of this invention to provide a torch carriage which enables an operator to accurately trace the torch along any narrow path on a workpiece. It is also an object of this invention to provide a torch carriage which enables an operator to remotely guide the travel of the torch along the desired workpiece path. An additional object of this invention is to provide a torch carriage which enables an operator to control the direction of travel of the torch in two dimensions. Still another objection of this invention is to provide a torch carriage which enables an operator to control the speed of travel of the torch in a direction transverse to the direction of the carriage. Another object of this invention is to provide a torch carriage capable of performing on vertically or horizontally oriented flat or arcuate workpieces. A further object of this invention is to provide a torch carriage which is capable of accurately tracing a narrow linear or nonlinear path on the outside or inside wall of a tubular workpiece. Yet another object of this invention is to provide a torch carriage which is firmly magnetically engaged with the workpiece regardless of its shape or orientation. Still another object of this invention is to provide a torch carriage which is easily disengaged from magnetic engagement with the workpiece. A further object of this invention is to provide a torch carriage which enables an operator to adjust the elevation or distance of the torch from the workpiece surface. Yet another object of this invention is to provide a torch carriage which enables an operator to adjust the angle of the torch with respect to the workpiece suitable so as to create a "bevel" on the workpiece. And it is an object of this invention to provide a torch carrier which permits selection of the transverse carriage and torch speeds so as to provide a miter angle on a workpiece.

SUMMARY OF THE INVENTION

In accordance with the invention, a carriage is provided for guiding a cutting, beveling or welding torch on the surface of a metal workpiece. The carriage has a chassis which is transported along a main path on the workpiece by a wheel assembly. The wheels of the assembly magnetically maintain engagement with the workpiece. A reversible motor mounted on the chassis drives the wheels so as to transport the chassis forward or backward along the main path. A rack and pinion assembly mounted on the chassis transports a torch holder along a path perpendicular to the main path. Another reversible motor mounted on the chassis drives the pinion of the rack and pinion assembly so as to transport the holder to the left or to the right along the perpendicular path. A remote controller electrically connected to the drive motors is manually operable to simultaneously permit forward or backward transport of the chassis and right or left transport of the holder, respectively, so as to accurately trace any cutting path on the workpiece with the torch. The remote controller has one toggle switch for selecting from the forward, off and backward operating conditions of the wheel assembly motor and another toggle switch for selecting from the left, off and right operating conditions of the rack and pinion motor. The controller is further manually operable to vary the angular velocity of the chassis motor and the rack and pinion motor, for example, by use of rheostats electrically connected to the motors. One mechanism, such as another rack and pinion assembly, is provided for manually adjusting the elevation of the torch above the workpiece and another mechanism is provided for manually adjusting the angle of incidence between the torch and the workpiece. A lift assembly permits manual disengagement of the magnetic wheel assembly from the workpiece. In a preferred lift assembly, an axle is journalled on the chassis for rotation about a longitudinal axis perpendicular to the main path of the chassis and a lever extends radially from the axle for a distance sufficient to permit engagement of the lever with the workpiece. A knob or crank on the lever facilitates manual rotation of the axle to engage the lever against the workpiece and pry the wheels from the workpiece. In order to limit deflection of the torch transport rack in relation to the chassis, at least two cams are spaced apart and rotatable to take up slack between the chassis and the torch transport rack. Set screws lock the cams in their selected angular position. A shield mounted on the chassis in the space between the wheel assembly and the torch holder protects the carriage components from the heat of the torch.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Turning first to FIGS. 1 through 6, a carriage C carries a cutting or welding torch, which is used to cut, bevel or weld vertical or horizontal plate or pipe (not shown).

The carriage C consists of a frame or chassis 11 which is transported by a wheel assembly 13 with front and rear wheels 15 and 17. The carriage C is held to the pipe or plate by the permanent magnets (not shown) located in the wheels 15 and 17 of the carriage C. An in line 90-volt D.C. reversible drive motor moves the carriage in a forward or reverse direction. Alternatively, the motor 19 can be non-reversing if a transmission 20 is employed. The current can be varied to the DC drive motor 19 to increase or decrease the velocity of the carriage C.

A torch holder assembly H is mounted on and carried by the chassis 11. The torch holder assembly includes a torch arm block 23 which is mounted on the chassis 11 and supports a torch arm 25 which extends through the block 23 in a direction transverse to the direction of movement 27 of the carriage C. The torch arm 25 is longer than the carriage C is wide. A rack 29 extending long the length of the torch arm 25 engages with a pinion 31 on the shaft 33 of the torch arm motor 21. The arm 25 is seated on rollers 35 so that the operation of the rack and pinion 29 and 31 drives the torch arm 25 to the left or right in response to the rotation of the torch arm motor shaft 33. Thus, the direction of motion 37 of the torch arm 25 is perpendicular to the direction of motion 27 of the carriage C. The torch arm 25 extends through nylon bushings 41 and 43 which are spaced apart by an aluminum spacer 45. Screws 47 secure the bushings and spacer 41, 43 and 45 in place. Tension cams 51 and 53 which support the rollers 35 on which the torch arm 25 moves, assure a firm sliding engagement between the chassis 11 and the torch arm 25 so as to minimize the possibility of deviation of these components. In order to assure that the slack between the chassis 11 and the torch arm 25 is securely taken up, tension adjustment screws 55 and 57 are used to lock the cams 51 and 53 in place after they have been rotated to properly position the rollers 35.

The torch holder assembly H further includes a torch support 61 which is mounted on and extends transversely from one end of the torch arm 25. A torch holder 63 is mounted on the torch support 61. The torch holder can also be rotated in a clockwise or counterclockwise direction, preferably by use of a ratchet lever 69, to create up to a maximum 40-degree forward or backward bevel on the work piece. As shown, the torch holder 63 is configured so as to hold the torch T in an upright or reference position in relation to the plane of the carriage wheels 15 and 17. As shown, the torch holder 63 is engaged on the torch support 61 by use of a sleeve 65 rotatably mounted on a post 67 on the end of the torch holder 63. Thus, the angular relationship of the torch T to the plane of the work piece on which the carriage C is transported can be varied by rotating the sleeve 65 on the post 67. To this end, the ratchet lever 69 is mounted on the torch holder 63 to lock the torch holder 63 in selected angular relationship to the torch support 61. In a preferred arrangement, by pulling and turning the ratchet lever 69, the sleeve 65 is released for rotation to its desired angular position on the post 67. Release of the ratchet lever 69 locks the holder 63 and the support 61 in this angular relationship. A 12-volt in line DC reversible gear motor 21 moves the torch holder 63 left or right 37, perpendicular to the direction of movement 27 of the carriage C. The current can be varied to the torch arm or gear motor 21 to increase or decrease the velocity of the torch holder 63 on the perpendicular path 37.

Figure 3:
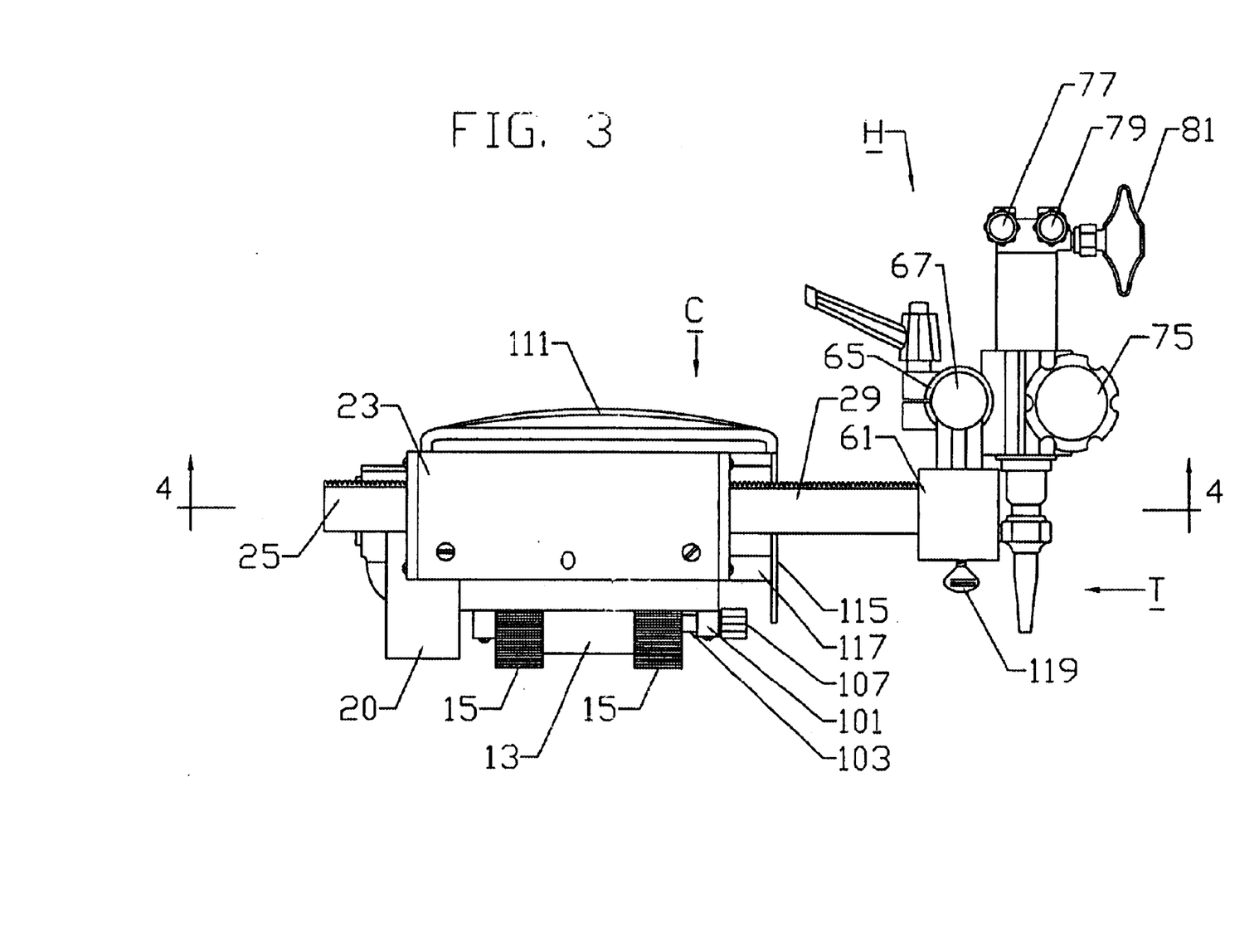
FIG. 3 is a front elevation view of the carriage of FIG. 1.
Figure 4:
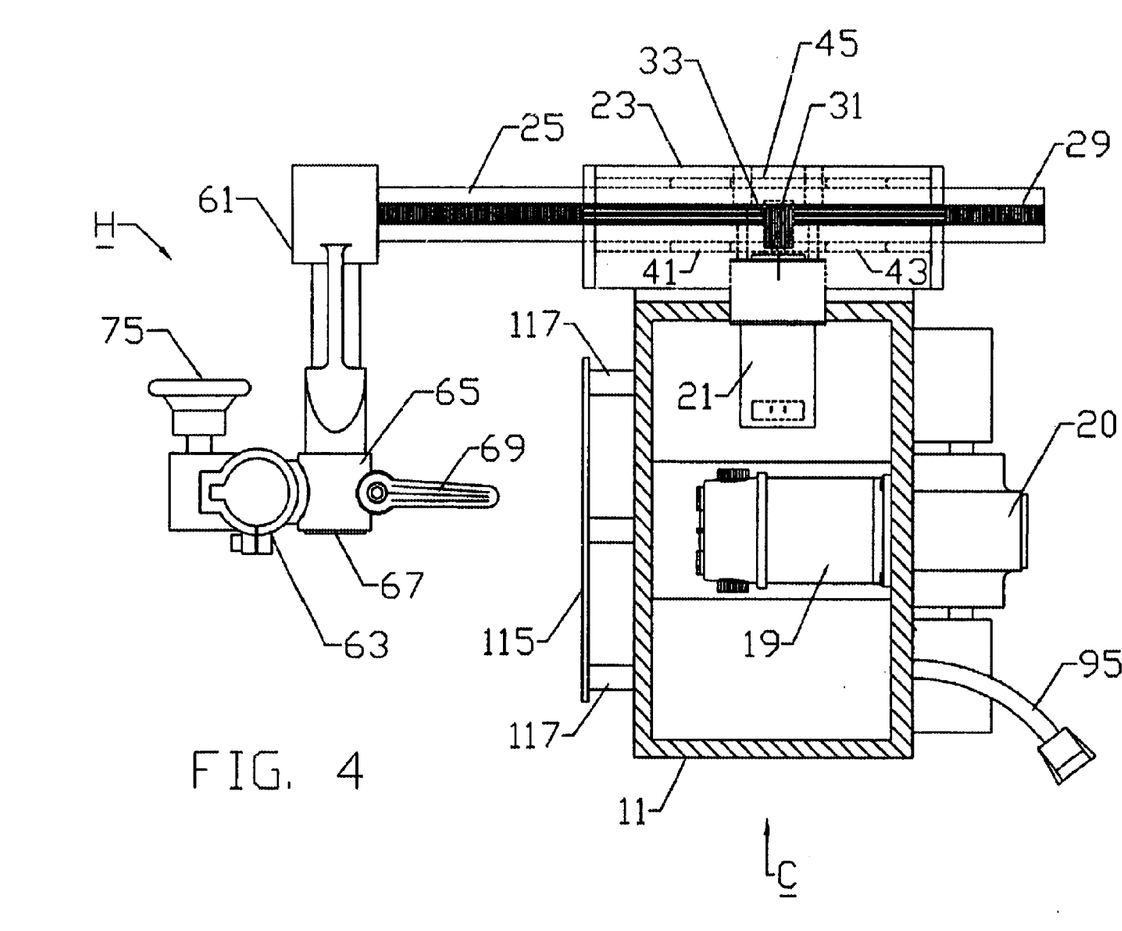
FIG. 4 is a cross-sectional view taken along the line 4—4 of FIG. 3.
Figure 5:
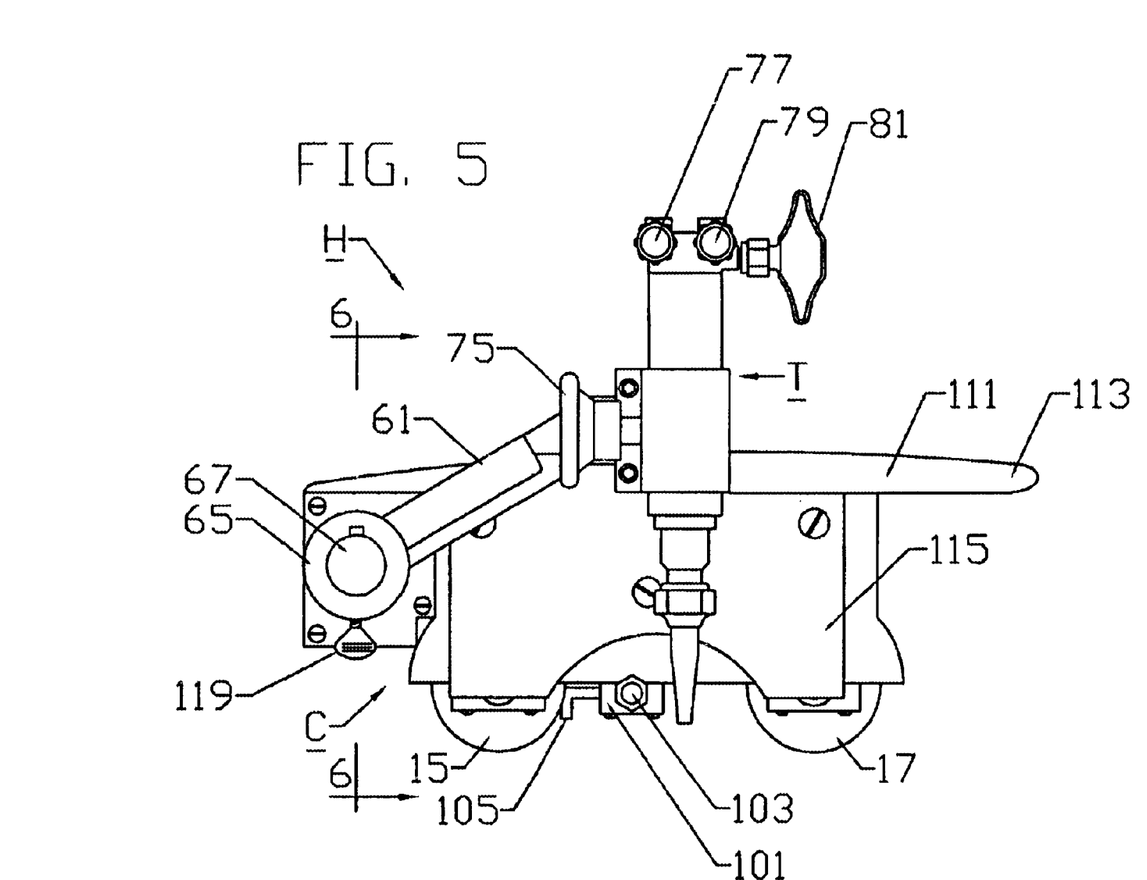
FIG. 5 is a side elevation view of the carriage of FIG. 1.

In addition to permitting variation in the angular relationship of the torch T to the work piece, the torch holder assembly H also permits variation of the distance between the torch T and the work piece. To this end, a rack 71 on the outer wall of the torch T engages with a pinion 73 connected to an adjustment knob 75 on the torch holder assembly H. Thus, by manual operation of the adjustment knob 75, the distance of the torch T from the work piece can be upwardly or downwardly varied. As is best seen in FIG. 3, the torch T typically employs an oxygen valve 77, an acetylene valve 79 and a mixing control valve 81 as part of the torch T.

Figure 7:
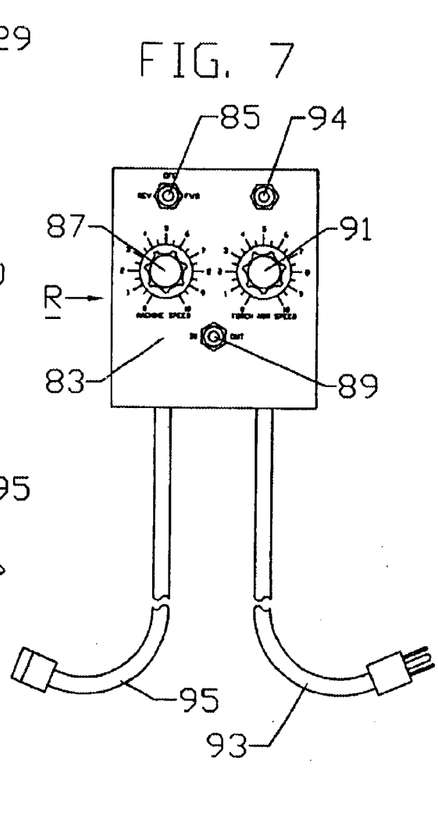
FIG. 7 is a top plan view of a preferred embodiment of a remote controller for the carriage of FIG. 1.

A motor control box R shown in FIG. 7 remotely controls the functions of the carriage C. The motor control box R provides control of the speed and direction of the carriage C and speed and direction of the torch holder 63 in a direction 37 perpendicular to the carriage direction 27. The box R has a case 83 containing the control circuitry hereinafter described in relation to FIG. 8. On the face of the case 83, a three-position toggle switch 85 is used to control the clockwise or counterclockwise rotation of the DC drive or carriage motor 19. The center position of the three-position toggle switch 85 terminates DC current to the drive motor 19 and serves as an "off" position of the switch 85. Moving the three-position toggle switch 85 of the motor control box R to left or right or forward or reverse position applies current to the in line 90-volt DC drive motor 19 to cause the carriage C to move in a forward or reverse direction. A rheostat 87 allows adjustment of the DC current to the DC drive motor 19 to control the DC drive motor speed and, therefore, the speed of the carriage C. Rotating the rheostat 87 clockwise or counterclockwise to increase or decrease the current to DC drive motor 19 causes the motor 19 and, therefore, the carriage C to go faster or slower. A three position momentary toggle switch 89 controls the direction of the DC in-line gearmotor or torch arm motor 21. The center position of the three position momentary toggle switch 89 is the "off" position for the gearmotor switch 89. Pushing the three position momentary toggle switch 89 to the right or left applies DC current to the 12-volt in line DC gear motor 21 and causes the 12-volt in line DC gearmotor 21 to rotate the pinion 31. As the pinion 31 rotates, it moves the torch arm 25 left or right in the torch arm block 23, thus moving the torch T perpendicular to the direction of carriage movement 27. T Another rheostat 91 allows adjustment of the DC current to the gear motor 21 to control the gearmotor speed and, therefore, the speed of the torch arm 25. Rotating the rheostat 91 clockwise or counterclockwise to increase or decrease the current of the DC gearmotor 21 causes the gearmotor 21 and, therefore, the torch arm 25 to go faster or slower. The motor control box R has a power cord 93 for connection to a 120 volt A.C. power source (not shown). As shown, the remote control box arm may also be provided with a master switch 94 permitting all of the circuits to be simultaneously energized or de-energized. There are five leads in the output cable 95 from the motor control box R. Two of the leads serve the 90 volt DC circuits and two serve the 12 volt DC circuits. The fifth lead connects the carriage C to earth ground.

Figure 8:
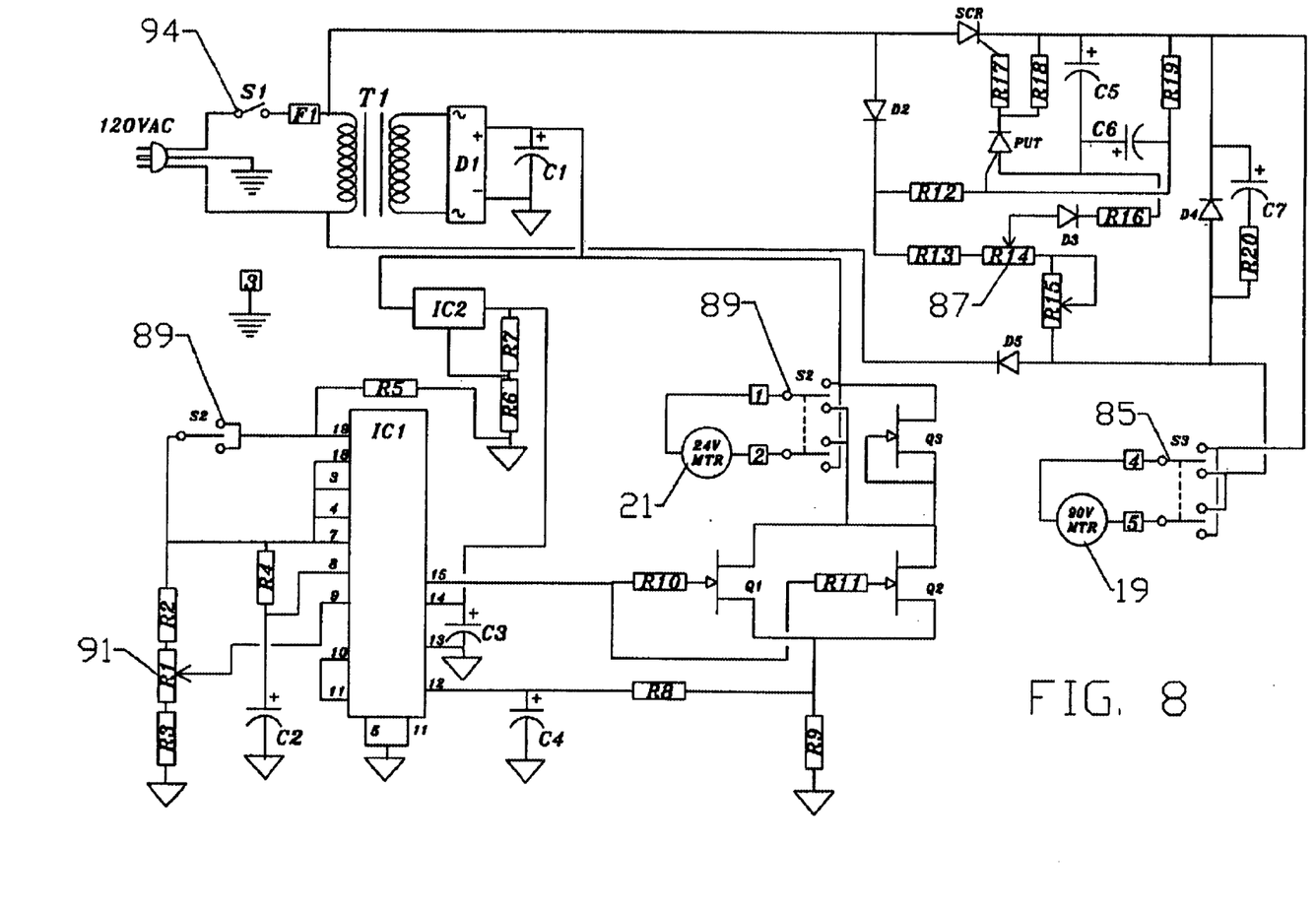
FIG. 8 is an electrical schematic diagram illustrating the power and control circuits of the carriage of FIG. 1.

The electrical circuits of the prototype device are illustrated in FIG. 8. The input from a 120 V AC source is connected through the single pole, single throw master switch S1 or 94 to a transformer T1. The carriage motor 19 is connected to the primary site of the transformer T1 and controlled by the double pole, double throw, three position drive motor switch S3 or 85. The speed of the carriage motor is varied by the machine speed rheostat R14 or 87. The torch arm motor 21 is connected to the secondary side of the transformer $T_1$ and controlled by the three pole, double throw, three position torch arm switch S2 or 89. The speed of the torch arm motor 21 is varied by use of the torch arm speed rheostat R1 or 91. In the prototype circuit, the circuit components are connected as shown in FIG. 8 and identified in the following schedule of components:

| | |
|---|---|
| C1 = | 1000uf63VDC |
| C2 = | .0047uf |
| C3 = | 10uf 50VDC |
| C4 = | .001uf |
| D1 = | 1AMP FULLWAVE BRIDGE |
| F1 = | 3AMP SLOBLOW |
| IC1 = | MC33033P MOTOR CONTROLLER |
| 1C2 = | LM317T VARIABLE REGULATOR |
| Q1 = | IRF510 |
| Q2 = | IRF510 |
| Q3 = | IRF510 |
| R1 = | 10K ROCKER POT |
| R2 = | 8K 1/4W |
| R3 = | 5K 1/4W |
| R4 = | 10K 1/4W |
| R5 = | 4.7K 1/4W |
| R6 = | 2.7K 1/4W |
| R7 = | 240 OHM |
| R8 = | 1K 1/4W |
| R9 = | .25 OHM |
| R10 = | 47 OHM |
| R11 = | 47 OHM |
| S1 = | SPST SWITCH |
| S2 = | 3PDT 3POSITION |
| T1 = | F-374P TRANSFORMER |
| C5 = | .22uf 25OV |
| C6 = | .1uf 250 V |
| C7 = | .1uf 400 V |
| D2 = | 1N4005 DIODE |
| D3 = | 1N4005 DIODE |
| D4 = | IN5406 DIODE |
| D5 = | IN5406 DIODE |
| PUT = | 2N6027 TRANSISTER |
| R12 = | 47K 1/2W |
| R13 = | 3.3K 1/2W |
| R14 = | 50K 2W POT. |
| R15 = | 10K 1/2W POT. |
| R16 = | 22K 1/2W |
| R17 = | 47 OHM 1/2W |
| R18 = | 470 OHM 1/2W |
| R19 = | 4.7K 1/2W |
| R20 = | 4.7K 1/2W |
| S3 = | DPDT 3 POSITION |
| SCR = | 2N6509 SCR |

Many variations of these circuits will be obvious to those skilled in the art. The circuits shown are offered as a workable example. One suggested variation is the use of a rocker switch in place of the torch arm rheostat 91 so that the torch speed will vary according to the pressure applied to the rocker switch.

Figure 1:
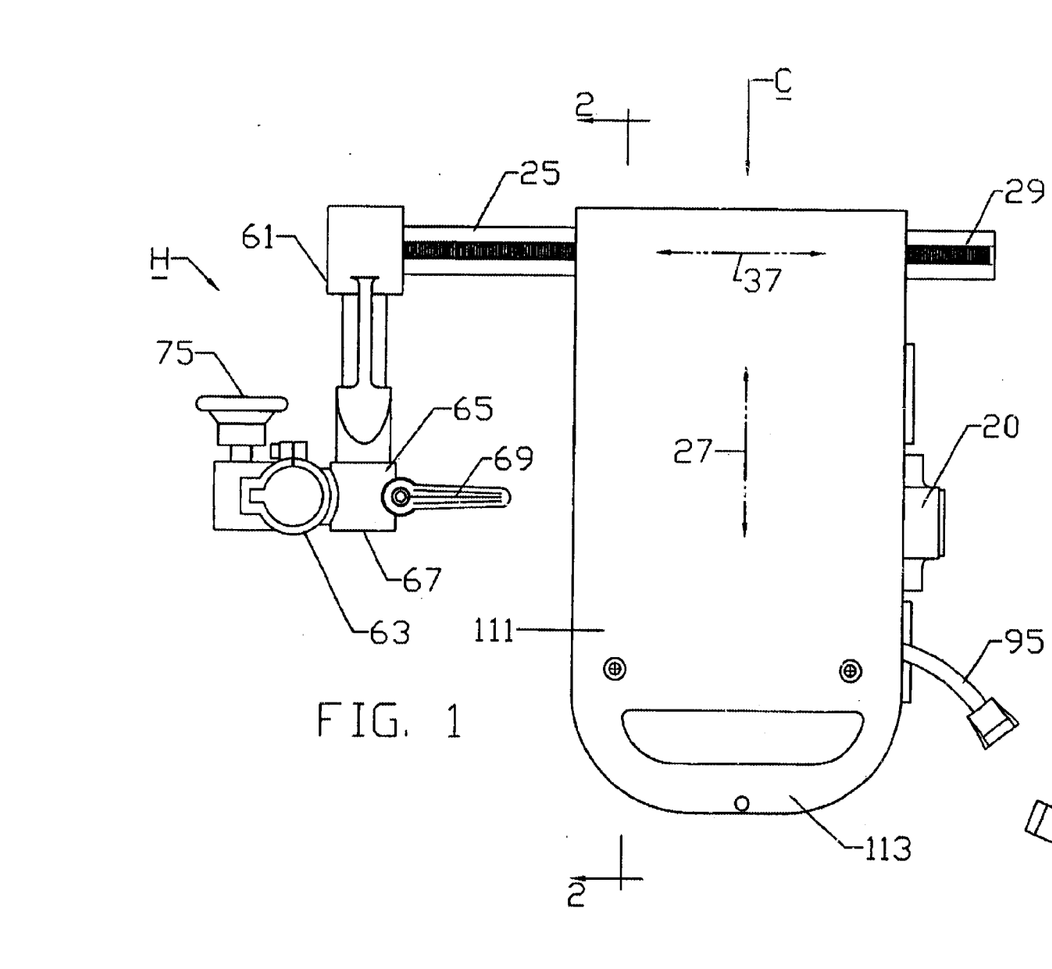
FIG. 1 is a top plan view of a preferred embodiment of the cutting/welding torch carriage.
Figure 2:
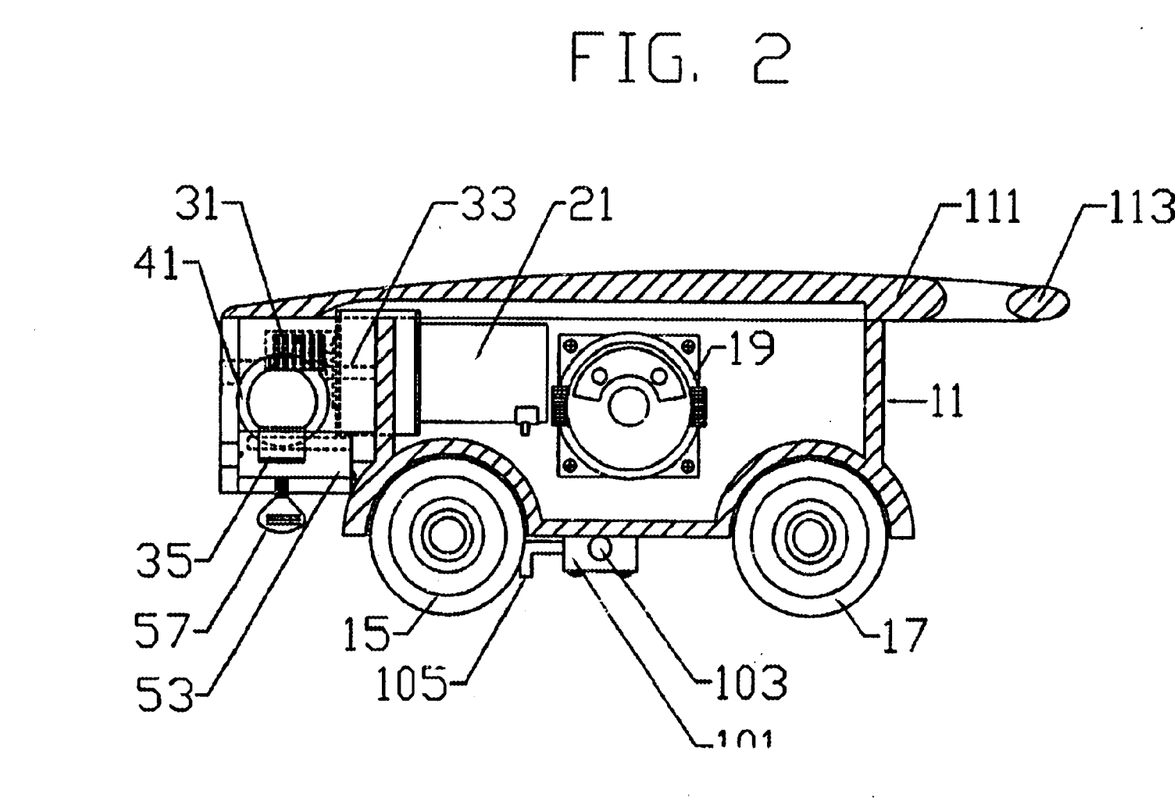
FIG. 2 is a cross-sectional view taken along the line 2—2 of FIG. 1.
Figure 6:
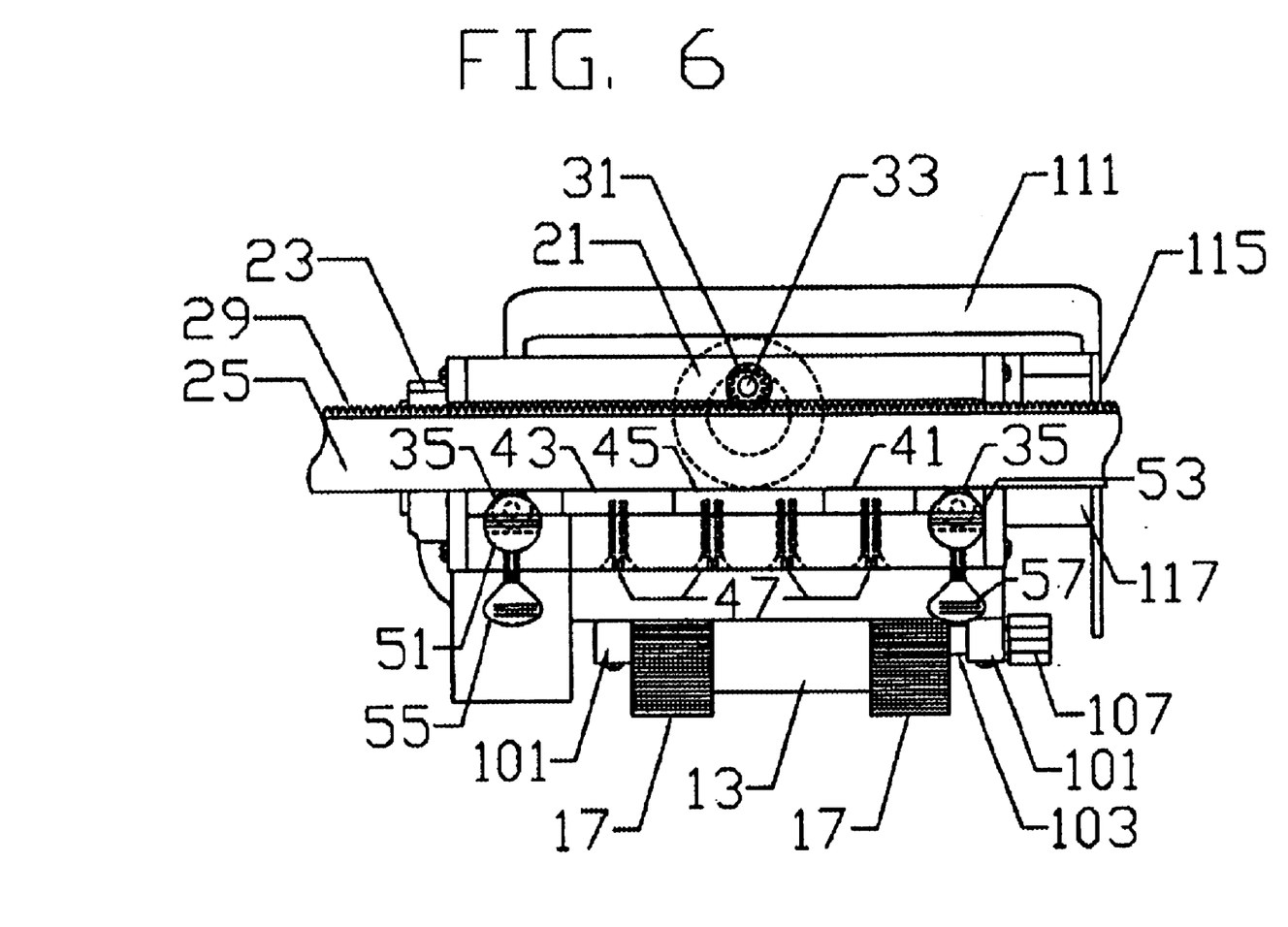
FIG. 6 is a cross-sectional view taken along the line 6—6 of FIG. 5.

Preferably, the carriage C includes a mechanism for facilitating disengagement of the magnetic wheels 15 and 17 from the work piece. As best seen in FIGS. 2, 3 and 6, the underside of the chassis 11 is provided with lifting blocks 101 in which a lifting block axle 103 is journaled. A lift lever 105 extends radially from the axle 103 and is long enough to engage against the work piece. A knob 107 on the end of the axle 103 is rotatable by the operator to cause the lever to engage against the work piece and pry the wheels 15 and 17 from the work piece.

The carriage is provided with a cover 111 having a handle 113 at one end to facilitate carrying and manipulation of the carriage C. To assure that the unit is not damaged by the heat of the torch T, a heat shield 115 mounted on spacers 117 is disposed between the carriage C and the torch T. Furthermore, as shown, to facilitate changes of the torch T and/or other components of the torch holder assembly H, the torch support 61 may be slidably engaged on the end of the torch arm 25 and a set screw 119 used to secure the torch support 61 in place on the arm 25.

In a prototype of the carriage C, the carriage motor 19 was a 50–60 Hz, 110 v dc, 7500 rpm in-line motor. The torch arm or gear motor 21 was a 12/24 v dc in-line gear motor with a 218.4:1 ratio.

In operation, the carriage C is mounted on the pipe or plate close to the point where the pipe or plate is to be cut. The DC output lead 95 of the motor control box R is plugged into the device with the toggle switch 85 in the "off" position. The AC input lead 95 is plugged into a 120-volt power source. The three-position toggle switch 85 is moved to the left and then to the right to make sure the carriage C will move in the forward and reverse directions. The three-position toggle switch 85 is returned to the center or "off" position. The three position momentary toggle switch 89 is moved to the right and left to make sure the torch arm 25 will move left and right 37 perpendicular to the line of travel 27 of the carriage C. The torch T is lighted and adjusted to a distance from the work piece as required. The three position momentary toggle switch 89 is moved to the right and left until the torch T is located at the point where the pipe or plate is to be cut. The pipe or plate is preheated to the desired temperature. The three position toggle switch 85 is moved to the left or the right to start the carriage C moving in the desired direction 27. The oxygen valve 77 of the torch T is rotated or flipped to the position necessary to cut, bevel or weld the work piece. As the carriage C moves on the work piece, the three position momentary toggle switch 89 is pushed to the right or left as necessary to move the torch T onto the desired path. When the operation is complete, the oxygen valve 77 is rotated or flipped to the "off" position and the three-position toggle switch 85 is moved to the center or "off" position to stop the movement of the carriage C.

Thus, it is apparent that there has been provided, in accordance with the invention, a cutting, beveling or welding torch carriage that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A carriage for guiding a torch on a metal work piece comprising:
   a chassis;
   a wheel assembly mounted on said chassis having wheels oriented to transport said chassis along a first path on the work piece, said wheels magnetically maintaining engagement with the work piece;
   first drive means mounted on said chassis for rotating said wheels in opposite directions to transport said chassis forward and backward along said first path;
   a holder for the torch;
   a rack and pinion assembly mounted on said chassis to transport said holder along a second path perpendicular to said first path;
   second drive means mounted on said chassis for rotating a pinion of said rack and pinion assembly in opposite directions to transport said holder to the left and to the right along said second path; and
   a portable remote controller electrically connected to said first and second drive means and manually operable in response to simultaneous visual observation of the torch and the workpiece to cause one of forward and backward transport of said chassis and one of right and left transport of said holder, respectively, so as to guide the torch along and maintain alignment of the torch with a predetermined path on the workpiece.

2. A carriage according to claim 1, said remote controller having first toggle means for selecting one of forward, off and backward operating conditions of said first drive means.

3. A carriage according to claim 1, said remote controller having second toggle means for selecting one of left, off and right operating conditions of said second drive means.

4. A carriage according to claim 1, said controller further being manually operable to vary an angular velocity of said first drive means.

5. A carriage according to claim 4, said remote controller having a first rheostat electrically connected to said first drive means.

6. A carriage according to claim 1, said controller further being manually operable to vary an angular velocity of said second drive means.

7. A carriage according to claim 6, said remote controller having a second rheostat electrically connected to said second drive means.

8. A carriage according to claim 1, said holder having means for manually adjusting a distance between the torch and the work piece.

9. A carriage according to claim 8, said distance adjusting means comprising a manually rotatable pinion on said holder for engagement with a rack disposed on the torch.

10. A carriage according to claim 1, said holder having means for manually adjusting an angle of incidence between the torch and the work piece.

11. A carriage according to claim 10, said angle adjusting means comprising:
   a sleeve rotatable about a post; and
   a ratchet lever latching said sleeve to said post.

12. A carriage according to claim 1, said chassis further comprising a lift assembly for manually disengaging said wheel assembly from the work piece.

13. A carriage according to claim 12, said lift assembly comprising:
   an axle journalled on said chassis for rotation about a longitudinal axis perpendicular to said first path;
   a lever extending radially from said axle for a distance sufficient to permit engagement thereof with the work piece; and
   means for manually rotating said axle to engage said lever against the work piece and pry said wheels from the work piece.

14. A carriage according to claim 1 further comprising means for limiting a deflection of said rack from said chassis.

15. A carriage according to claim 14, said limiting means comprising:
   at least two cams spaced apart and rotatable between said chassis and said rack to take up slack therebetween; and
   means for locking said cams in a selected angular position.

16. A carriage according to claim 1 further comprising a heat shield mounted on said chassis and spaced between said wheel assembly and said torch holder.

17. A carriage according to claim 2 further comprising a heat shield mounted on said chassis and spaced between said wheel assembly and said torch holder.

18. A method for an operator to guide a torch on a predetermined path on a metal workpiece comprising the steps of:
   mounting the torch in a holder fixed to the rack of a rack and pinion assembly carried by a chassis having magnetic wheels oriented for rotation about axes fixed in parallel relationship to the rack, the pinion and at least one of the wheels being driven by reversible variable speed motors controlled by a portable remote manually operated station;
   placing the chassis with the wheels on and magnetically maintaining contact with the surface of the workpiece;
   lighting the torch;
   simultaneously holding the station and visually observing the lighted torch and the predetermined path;
   manually controlling operation of the pinion drive motor from the remote station to visually align the lighted torch with the predetermined path;
   manually controlling operation of the wheel drive motor from the remote station to set a visually observably satisfactory direction and speed at which the aligned torch traverses the workpiece;
   simultaneously continuing manual control of the speed and direction of the pinion drive motor from the portable remote station and visual observation of the aligned torch and the predetermined path so as to guide the torch along and maintain alignment of the torch with the predetermined path; and
   manually controlling operation of the pinion drive motor from the remote station when the torch has completely traced the predetermined path to cease driving the pinion.

19. A method according to claim 18 further comprising the step of manually adjusting the height of the lighted torch relative to the workpiece to a visually observably satisfactory distance above the workpiece.

20. A method according to claim 19 further comprising the step of manually adjusting a flow rate of oxygen to the torch before guiding the torch along the predetermined flow path.

* * * * *